United States Patent [19]  [11] 3,769,770
Deschamps et al.  [45] Nov. 6, 1973

[54] THERMAL SUPER INSULATION
[75] Inventors: Nicholas Howard Deschamps, Reeds Ferry; Gerald L. Bernier, Hudson, both of N.H.
[73] Assignee: Sanders Nuclear Corp., Nashua, N.H.
[22] Filed: Jan. 23, 1969
[21] Appl. No.: 793,407

[52] U.S. Cl. .................. 52/404, 52/743, 117/100, 117/126, 161/161, 161/407, 161/DIG. 5
[51] Int. Cl. ............................................. E04b 1/76
[58] Field of Search .................. 52/612, 615, 404, 52/406, 743; 161/407, 161; 117/100 SI, 100 I, 126 GM

[56] References Cited
UNITED STATES PATENTS
3,189,535  6/1965  Webb .............................. 117/100
2,978,340  4/1961  Veatch et al. ....................... 65/21 X Primary Examiner—Alfred C. Perham
Attorney—Louis Etlinger

[57] ABSTRACT

Thermal super insulation is formed by utilizing highly heat reflective, thin layers on bases under vacuum conditions to increase radiation reflection and decrease radiation heat transfer through the insulation. Thermal super insulation preferably comprises a plurality of extremely small spheres of a hard, low thermal conductivity material grouped together in point contact with adjacent spheres. The spheres are individually coated with a thin layer of a highly heat reflective, low emissivity material. Interstitial spaces between the spheres are maintained in a vacuum. The spheres are preferably hollow and formed of an inorganic insulating material with a thin metallic heat reflective surface layer. In some cases, fibers rather than spheres are used and are coated with the heat reflective surface layer preferably by a sputtering technique. The thermal super insulation material is used to form a heat barrier by positioning a plurality of spheres or fibers in a compact mass over a surface to be insulated. The spaces formed between the spheres or fibers are then maintained in a vacuum to obtain good heat insulation values when used in extremely high temperature applications.

8 Claims, 4 Drawing Figures

PATENTED NOV 6 1973 3,769,770

INVENTORS
NICHOLAS H. DE CHAMPS
GERALD L. BERNIER

BY *Richard J. Seligman*

ATTORNEY

THERMAL SUPER INSULATION

BACKGROUND OF THE INVENTION

In recent years, the need for thermal super insulation materials, i.e., having a thermal conductivity of no more than about 0.001 B/hr-ft-° F. at mean temperatures of 1,000° F. has become great in various applications including space satellites and particularly where extremely high temperature operations are used as with radioactive power sources. Various insulation materials are now used with one of the most successful materials being Linde Multi-Foil insulation (a product of Union Carbide Corp). composed of alternate layers of very thin foil and fibrous insulation maintained in a vacuum. The layers per inch of thickness in such Multi-Foil vary with the specific application. Commonly Multi-Foil insulation is formed with 75 thin reflective metal foils per inch which act as 75 reflective radiation barriers per inch of heat transfer path. The fibrous layers in the Multi-Foil serve only to separate the foils from one another to prevent conductive thermal shorting. The Multi-Foil insulation is difficult to use in insulating objects that have small radii, rapidly changing contours or sharp corners since bending of the foil may introduce thermal shunts. Often it is necessary to build up an insulation layer of Multi-Foil directly on a particular object to be insulated thus requiring fabrication at the insulation manufacturer's plant which increases the insulation cost. However, in spite of the problems, Multi-Foil super insulation is often used because of its low thermal conductivity which is in the order of 0.00218 B/hr-ft-° F. at a temperature of 1,000° F. In addition, the Multi-Foil insulation materials known in the art have negligible heat loss due to convection or conduction and are specifically designed to cut down heat transfer by radiation.

Fibrefrax (a product of Carborunduna Corp.), Dynaquartz (a product of Johns Mansville, Inc.) and MIN-K (a product of Johns Mansville, Inc.) are other known thermal super insulation materials which are used in high temperature applications. These materials are nonvacuum based materials which utilize fibrous media and in the case of MIN-K, particulate matter mixed therewith. These materials while good insulators, do not provide sufficient barriers to heat transfer by radiation and thus often lose significant insulation value at high temperatures of 1,000° F. or more.

It is an object of this invention to provide a thermal super insulation material for use under vacuum conditions in high temperature applications.

The thermal super insulation material of the present invention is particularly desirable since it overcomes many of the problems of the prior art. It can be designed to have a thermal conductivity of 0.000218 B/hr-ft-° F. and below at extremely high temperatures. It can be manufactured and used at relatively low cost as compared with other super insulating materials. It is versatile and flexible and can be easily shaped to mate with any device or configuration requiring insulation with minimized applied bulking.

SUMMARY OF THE INVENTION

According to the invention, thermal super insulation utilizes highly reflective, thin layers on high temperature resistant bases to increase reflection and decrease heat transfer by radiation. Preferably the thermal super insulation comprises a plurality of spheres of a hard low thermal conductivity material grouped together with point contact between adjacent spheres and a vacuum is created in the interstices between the spheres thus forming a heat barrier. The spheres are individually coated with a thin layer of highly heat reflective, low emissivity material which is preferably a reflective metal. Preferably the spheres are uniform in size and are formed of a peripheral wall of an inorganic insulating material defining a space therein which may be filled with air, other gas or evacuated. In the preferred embodiment, the spheres each have a diameter no greater than 250 microns, the sphere walls have a thickness no greater than 10 microns and the heat reflective layers each have a thickness no greater than 5 microns.

In insulating an object in accordance with a method of this invention, the spheres described above are formed into a super insulation heat barrier by positioning a plurality of the spheres in point contact with each other in a compact mass defining interstitial spaces therebetween about the object to be insulated. The spaces formed between the spheres are maintained at a vacuum preferably in the order of $10^{-4}$ Torr. Because of the point contact between spheres, heat transfer by conduction is substantially eliminated. Since high vacuum conditions are used, convective heat transfer is substantially eliminated. The large surface area of the heat reflective layers acts to retard heat transfer by radiation.

The invention also encompasses the use of a fiber base rather than individual spheres. Thus, fibrous material having good insulating values, for example, MIN-K is used with the fibers being coated with a thin layer of highly heat reflective, low emissivity material. The layer of reflective material is preferably a radiation reflective metal. The metal is preferably applied by a vacuum sputtering technique to deposit individual films around each fiber in a mass.

BRIEF DESCRIPTION OF THE DRAWINGS

The above and other advantages and features of the present invention will be better understood from the following specification when read in conjunction with the accompanying drawings in which.

DESCRIPTION OF PREFERRED EMBODIMENTS

Figure 1:
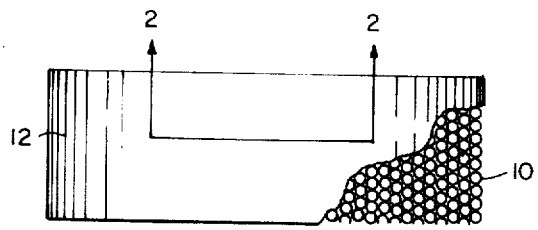
FIG. 1 is a top plan view with a portion broken away of an object insulated with the thermal super insulation in accordance with a preferred embodiment of the present invention.

With reference now to the drawings, the thermal super insulation in accordance with this invention is formed into a super insulation heat barrier designated generally at 10 interposed between a cylindrical object 11 to be insulated from a second enclosing cylindrical object 12.

In the preferred embodiment, the barrier 10 is formed by a plurality of extremely small hollow spheres 14 having interstitial spaces 20 maintained at a vacuum of $10^{-4}$ Torr. The spheres are preferably identical and each has a space 15 at the center thereof surrounded by a thin continuous spherical wall 16 and an overlying thin layer 17 of a highly heat reflective, low emissivity material.

The wall 16 of each sphere is preferably formed of an inorganic insulating material such as quartz ($SiO_2$), alumina, or zirconia with silicon dioxide materials being preferred because of their low thermal conductivity and good mechanical strength in certain forms. Hard materials are preferred for use to form substantially point contacts between the spheres. The interior space 15 is preferably evacuated during formation of the spheres to create a vacuum condition thus lowering thermal conductivity. However, the spaces can be filled with air, argon, zeon or other low thermal conductivity gases. In some cases, the spheres do not have a centrally located cavity or space 15 but are of a porous nature with low density. Thus, interconnecting or noninterconnecting cellular materials can form a base for layer 17. In some cases, the spheres need not be hollow. The use of solid low conductivity metals or ceramics for the spheres will only marginally reduce the heat transfer properties thereof under vacuum conditions at high temperatures.

The outer surface of each sphere is formed by a thin, continuous coating or layer 17 of a highly reflective, low emissivity material which is resistant to deterioration at high temperatures of 1,000° F. and above. Nickel is preferred for use although other metals such as rhodium, tantalum, rhenium and cobalt may also be used. The material of the layer 17 must be a good radiation heat reflector in all cases. Nickel is used in the preferred embodiment of this invention since it has high reflective properties as well as resistance to deterioration at extremely high temperatures in the order of 2,000° F. and higher. The thin layer 17 can be formed by conventional coating methods as for example the vapor deposition of nickel using nickel carbonyl, electrolytic deposition, sputtering and vacuum deposition methods. It is preferred that the coating method provide the layer 17 integrally bonded to the underlying surface of the wall 16 with a uniform thickness of the layer.

The particular dimensions of each sphere 14 and its elements may vary greatly depending upon the specific application for which the spheres are to be used. The layer 17 preferably has a thickness in the range of from 1 to 5 microns, wall 16 has a thickness in the range of from 2 to 10 microns and the spheres each have an outer diameter in the range of from 10 to 250 microns. Preferably uniform size and shape spheres are used in the barrier 10 to maximize point contact therebetween and thus reduce conductive heat transfer. However, some variation from uniform size is normally found in the spheres of this invention.

Figure 2:
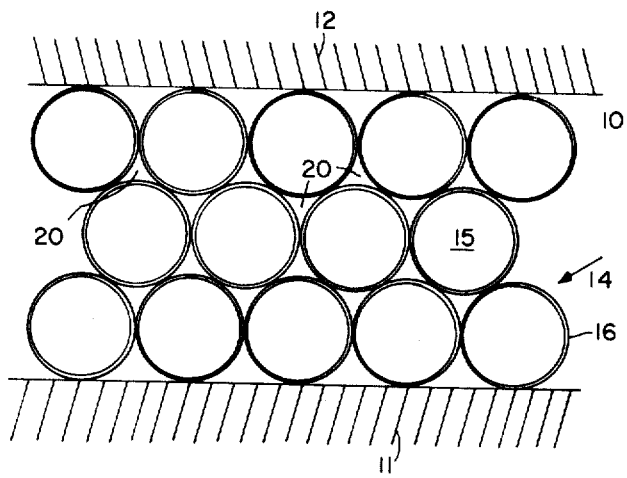
FIG. 2 is a greatly enlarged cross sectional view of a portion thereof taken through line 2—2.

To form an insulating barrier, a plurality of spheres are positioned in a compact mass and tightly held together with each sphere retaining its shape and having substantially point contacts with adjacent spheres as best shown in FIG. 2. Because of the point contacts, there is theoretically no transfer of heat in the barrier by solid conduction. The number of spheres used in any given insulating barrier may vary greatly depending upon the degree of insulation required. Similarly the number of rows vertically, horizontally or in any direction in a barrier of the type shown at 10 can vary. In all cases, there is at least one layer of spheres with adjacent spheres having substantially point contact with each other.

As best seen in FIG. 2, when a plurality of the spheres are positioned between an object 11, such as a radioactive heat source capsule, to be insulated from another object 12 such as a cylindrical wall, there are many interstitial spaces 20 formed between the spheres. These spaces are evacuated to a vacuum of at least $10^{-4}$ Torr thereby eliminating substantially heat flow through the barrier 10 by means of convection. Since there is no convective heat flow and substantially no conductive heat flow, in the barrier 10, the only other means for heat flow is by radiation. However, the layer 17 provides a barrier to radiation transmission which barrier is more effective than known insulations of the Multi-Foil type. The barrier 10 is more effective since a greater foil reflective surface area per unit volume is provided in the present barrier than is present in conventional Multi-Foil. For example, when the spheres each have a diameter of 75 microns, the reflective surface area per unit volume is 1,210 $in.^2/in.^3$ as compared to 150 $in.^2/in.^3$ for conventional Multi-Foil insulation. Radiational heat loss is prevented by the insulation of this invention so that conductivities in the order of 0.000218 B/hr-ft-° F. at a temperature of 1,000° F. can easily be obtained which conductivity is 1/10th that of known existing vacuum insulation. This low value is directly related to the large increase in the amount of reflective surfaces provided by the spheres of this invention.

In a specific example of this invention, barrier 10 is in spherical form and has a diameter of 2.25 inches. A point source heater is located at the center so that the barrier has an effective radial thickness of 1.125 inch. Hollow silicon dioxide (quartz) spheres of 50 to 250 micron average outer diameter are used with spaces 15 comprising a 30 percent void fraction and being at a vacuum. Layer 17 is nickel having an emissivity of 0.1, and a thickness of 1 micron. The barrier 10 is compactly filled with the spheres 14 and is maintained in a vacuum of $10^{-4}$ Torr. The following table indicates the value of thermal conductivity of the barrier at the temperatures indicated for the object 11:

| TEMPERATURE °F. | $K_{RAD}$, B/HR FT°F. |
|---|---|
| 1000 | 0.000218 |
| 1500 | 0.000525 |
| 2000 | 0.001050 |

It is preferred that the diameter of the spheres be small as the amount of conduction decreases as the diameter and emissivity of the spheres decrease. The radiation component of the spheres in the barrier of this invention is determined by the following formula:

$$K_{RAD} = f_A D_p \epsilon \sigma 4 T^3$$

where:
$f_A$ = void fraction
$D_p$ = diameter of spheres, ft.
$\sigma$ = Stephan-Boltzmann Constant, B/hr-ft-$^2R^4$
$T$ = absolute temperature, R
$\epsilon$ = emissivity Thus, for a packed volume as shown in FIG. 2 having small diameter spheres with highly reflective surfaces, the radiation component is minimized. This is further explained by considering the increase in reflective surfaces per unit volume as the diameter of spheres in a barrier is decreased. For example, the reflective are per unit volume of a packed barrier such as 10 is represented by the following formula:

Reflective Area Per Unit Volume
$= (1 - f_A)$ Area$_{Sphere}$/Volume$_{Sphere}$ × Unit Volume
$= 6 (1 - f_A)/D_p$ × Unit Volume Thus, there is an increase in radiation reflective area as the sphere diameter decreases.

The decrease in the radiation component of the overall packed bed heat transfer barrier 10 is not only the consequence of reducing sphere diameters. In addition to increasing the reflective surface per unit volume, the smaller sphere diameter also creates more solid contacts per unit volume. The number of contact points is also inversely proportional to $D_p$.

Theoretically, there is no solid conduction of heat between spheres since the contacts are infinitesimal point contacts which yield no cross sectional area for heat to flow. Actually, there is a finite heat flow at the points of contact or otherwise there would be infinite pressures present at these points. To keep the size of the contact areas at a minimum, it is preferred to have the spheres approach a true sphere shape and also to have the spheres made of a hard material both in their base as formed by wall 16 and reflective layer 17. Preferably the hardness is such as to minimize material deformation at the point contacts, thus, reducing the solid heat transfer path between spheres.

Figure 4:
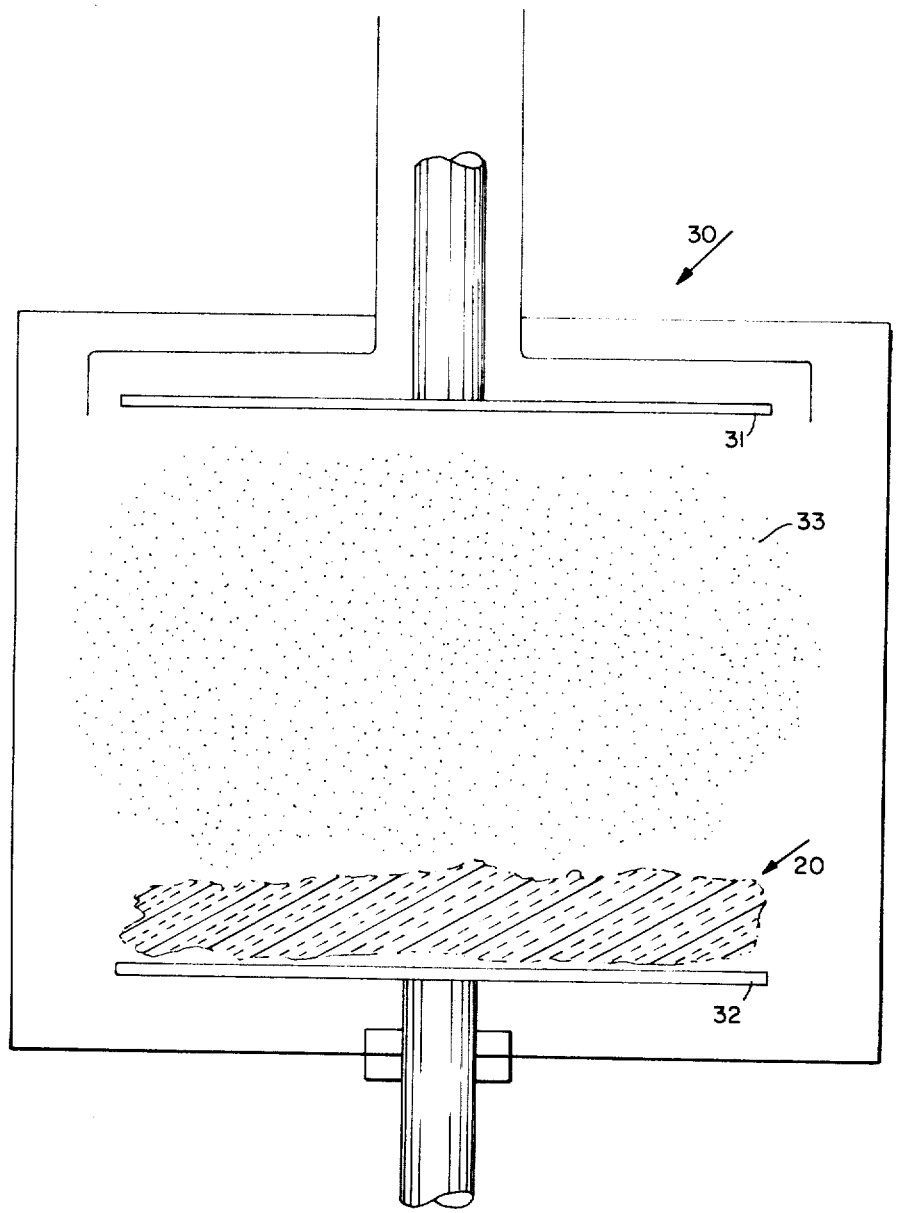
FIG. 4 is a semidiagrammatic view of a method of coating in accordance with this invention.

Turning now to an alternate embodiment of this invention, as diagrammatically illustrated in part in FIG. 4, fibers of a hard low thermal conductivity material are coated with a thin layer of a highly reflective, low emissivity material 17 such as previously described.

Figure 3:
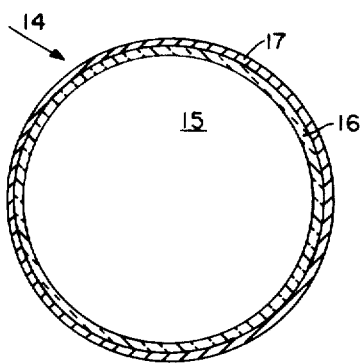
FIG. 3 is an enlarged cross sectional view through an element thereof.

The fibers are preferably formed of the same material as the bases formed by wall 16 as described with respect to the embodiments of FIGS. 1–3. Thus, the fibers can be porous, or have hollow centers with the pores or centers in a vacuum condition or filled with a gas. The fibers also can be solid. Preferably the fibers are formed of an inorganic material resistant to degradation at high temperatures of 1,000° F. and above. The coating layer 17 can be applied to the fibers individually although it is preferred to form the fibers in a mass which can be interlocked or noninterlocked and later form thin layers 17 over individual fibers thereof.

As previously described with respect to the embodiments of FIGS. 1–3, a heat barrier 20, made of a compact mass of fibers, of the alternate embodiment is maintained at a vacuum of at least $10^{-4}$ Torr. Thus, the coated fibers of the barrier 20 can be placed between two objects 11 and 12 and a vacuum created in the interstitial spaces to yield good insulation values even when one of the objects is at an extremely high temperature.

FIG. 4 illustrates a method of making the coated fibers to form the heat barrier of the alternate embodiment. The barrier 20 which may have a fibrous base of MIN-K (a bonded structure reinforced with fibrous media and containing appreciable quantities of particulate matter) is formed with the layers 17 in an apparatus of the type illustrated generally at 30. The apparatus 30 comprises a cathode 31, an anode 32, an argon plasma atmosphere 33. The MIN-K is positioned between the cathode and anode. Sputtering is then accomplished as for example by having the cathode of the metal to be deposited, such as nickel, and employing 2,000 to 4,000 volts in a conventional sputtering technique. It is found that thin films are deposited around corners and between filaments of the fiber mass forming good radiation reflective metal films substantially completely surrounding each fiber.

In some cases, metal films of layers 17 do not completely surround each fiber but sufficient surface area is provided to yield good heat radiation reflection.

While specific embodiments of the present invention have been shown and described, it should be understood that many modifications thereof are possible. Thus, particular materials can vary as can dimensions. The length of the fibers can vary as can their diameters although it is preferred that the fibers have diameters of no more than 250 microns and preferably about 100 microns.

The term "spheres" as used herein includes all natural spheres which may be true, oblate, prolate and the like. Thus, the term "spheres" would include particles of small size which minimize contact with adjacent particles when packed together.

What is claimed is:

1. Thermal super insulation for use under vacuum conditions comprising a plurality of microspheres of a hard low thermal conductivity material grouped together with substantial point contact between adjacent microspheres, said spheres defining interstitial spaces therebetween maintained at a vacuum of at least $10^{-4}$ Torr,
   and microspheres being hollow and each defining a space therein surrounded by a wall of an inorganic insulating material being individually coated with a thin layer of highly heat reflective, low emissivity metal.

2. Thermal super insulation in accordance with claim 1 wherein said spheres have a diameter no greater than 250 microns.

3. Thermal super insulation in accordance with claim 1 wherein said sphere walls have a thickness no greater than 10 microns.

4. Thermal super insulation in accordance with claim 1 wherein the material of said thin layer is selected from the group consisting of nickel, tantalum, rhenium and cobalt,
   and said layer has a thickness of from 1 to 5 microns.

5. A method of forming a super insulation heat barrier, said method comprising,
   positioning between objects to be insulated from one another a plurality of microspheres of an insulating material having diameters of no more than 250 microns each having a thin heat reflective, low emissivity layer thereover, in point contact with each other in a compact mass defining interstitial spaces therebetween,
   and maintaining said spaces at a vacuum of at least $10^{-4}$ Torr.

6. A thermal super insulation barrier comprising,
   a plurality of extremely small spheres of a hard, low thermal conductivity material grouped together with substantially point contact between adjacent spheres, each of said spheres defining at least one space therein and having outer diameters in the range from 10 to 250 microns,
   said low thermal conductivity material being resistant to degradation at temperatures of at least 1,000° F,
   said spheres each being coated with a continuous, thin layer of a highly heat reflective, low emissivity material, said heat reflective, low emissivity material being resistant to degradation at temperatures of at least 1,000° F, sid spheres defining interstitial space therebetween maintained at a vacuum of at least $10^{-4}$ Torr.

7. A thermal super insulation barrier in accordance with claim 6 wherein said at least one space is filled with a low heat conductivity gas.

8. A thermal super insulation barrier in accordance with claim 6 wherein said spheres have uniform diameters.